United States Patent

[11] 3,614,540

[72] Inventor Eugene A. Slusser
R.F.D. 1, Concord, N.H. 03301

[21] Appl. No. 23,395
[22] Filed Mar. 27, 1970
[45] Patented Oct. 19, 1971

[54] SUPPORT TRAY FOR PRINTED CIRCUIT BOARDS
1 Claim, 3 Drawing Figs.

[52] U.S. Cl. .......... 317/101 DH, 211/41, 219/385
[51] Int. Cl. .......... H02b 1/02
[50] Field of Search .......... 318/101 R, 101 C, 101 DH; 211/41; 339/17, 17 LM, 17 M, 17 LC, 150 B; 219/201, 385

[56] References Cited

UNITED STATES PATENTS

| | | | |
|---|---|---|---|
| 2,831,098 | 4/1958 | Luscher | 219/385 |
| 2,885,603 | 5/1959 | Rose | 317/101 DH UX |
| 2,945,989 | 7/1960 | Vogel et al. | 317/101 DH UX |
| 3,052,821 | 9/1962 | Scoville | 317/101 |
| 3,147,402 | 9/1964 | Hochstetler | 317/101 DH UX |
| 3,200,361 | 8/1965 | Schwartz et al. | 317/101 DH UX |
| 3,381,114 | 4/1968 | Nakanuma | 219/385 |

FOREIGN PATENTS

| | | | |
|---|---|---|---|
| 454,998 | 7/1968 | Switzerland | 317/101 DH |
| 1,044,960 | 10/1966 | Great Britain | 317/101 DH |
| 1,195,829 | 7/1965 | Germany | 317/101 DH |

*Primary Examiner*—David Smith, Jr.
*Attorney*—David H. Semmes

ABSTRACT: A support tray for printed circuit boards of the type used in life test and burn-in oven systems, particularly a support tray used to support a test printed circuit board and test components during burn-in. The support tray is characterized by its rigidity, ease of handling with the test components positioned thereon and insulated within the oven.

INVENTOR
EUGENE A. SLUSSER
BY David H. Semmes
ATTORNEY

SUPPORT TRAY FOR PRINTED CIRCUIT BOARDS

BACKGROUND OF THE INVENTION

1. Field of the Invention

Presently, integrated circuits are positioned upon interchangeable trays and are subjected to an elevated temperature life test and burn-in within a temperature chamber or oven. The oven is provided with special tray-holding inserts, electrical connectors and a power supply. Since literally hundreds of boards are being simultaneously tested, there has arisen a necessity for a universal tray to which the boards may be readily fastened, subjected to burn-in, and then removed. The trays are required to support the boards without injury during the life test and burn-in.

2. Description of the Prior Art

Prior art searching has developed the following typical systems as found in the following patents:

Buck, U.S. Pat. No. 2,951,185;

Humphreys, U.S. Pat. No. 3,009,102;

Suverkropp, U.S. Pat. No. 3,133,180;

Scherb, U.S. Pat. No. 3,151,279.

*Buck* generally teaches the concept of supporting printed circuit subassemblies and test fixtures as a tray. *Suverkropp* supports his trays 21 and circuit components within an oven for testing. *Humphreys* (column 1, lines 36–41) discusses his oven for testing a plurality of insulator resistances or like components. *Scherb's* is also a test fixture for holding circuit components for testing such as high- and low-temperature cycling, baking and the like.

SUMMARY OF THE INVENTION

According to present invention, extruded aluminum is bent so as to form a U-shape and a rigid aluminum handle is fastened to the open ends of the U-shape to form a test tray frame. A blue ribbon plug or similar electrical connector is inserted in the handle end and the printed circuit board is positioned upon the frame so as to overlap at the side edges, while underlapping at the closed end. The overlap provides for insulated support for the entire assembly within the oven and the underlap provides for grasping of the tray without touching of the printed circuit board during handling.

DESCRIPTION OF THE PREFERRED EMBODIMENTS

Figures 1, 2:
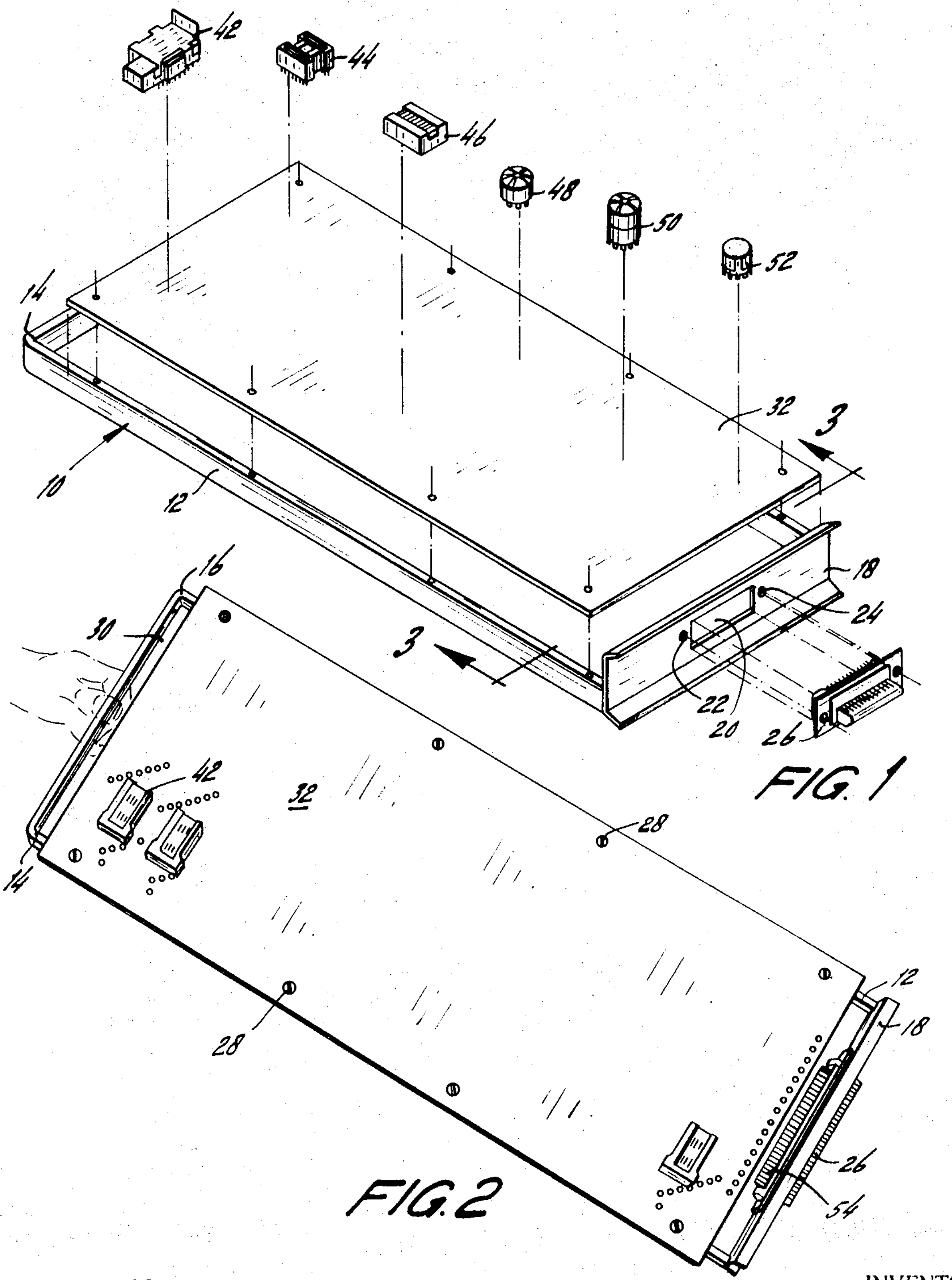
FIG. 1 is an exploded perspective, showing the printed circuit board positioned upon the support tray and the blue ribbon plug about to be inserted into the tray socket.
FIG. 2 is a top plan of the assembly showing the test tray being handled at its underlapping end.

In FIG. 1 the test tray generally designated as 10 is illustrated as manufactured from extruded aluminum into a U-shape having its open end closed by a rigid bent aluminum handle 18 defining socket 20 which may be used to support blue ribbon plug 26, having 16 to 32 pins secured therein. Plug 26 may be secured to handle 18 by means of a stove bolt or the like, not shown, extending into apertures 22 and 24.

Figure 3:
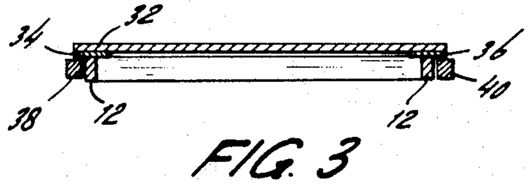
FIG. 3 is a transverse section, taken along section line 3—3 of FIG. 1 and showing the support of the reinforced edges of the circuit board upon the oven brackets, so as to avoid metal-to-metal contact.

The printed circuit board 32 is shorter than the shank portion of the frame intermediate the closed end and handle, so as to define a hand-grasping aperture 30, as illustrated in FIG. 2. Board 32 is of a sufficient width that it overlaps the frame elements 12, as illustrated in FIG. 3. The bottom edges of the board include longitudinally extending reinforcing strips 34 and 36 which serve to rigidize the board with respect to the frame and also serve as an insulative support, the edges 34 an 36 resting upon the metallic brackets 38 and 40 which are used to support the trays within the burn-in oven. The board and bottom edges may be secured to each other by epoxy or the like and the entire assembly secured to the frame by means of stove bolts or the like 28.

Printed circuit board 32 may have 24 sockets each having 14 independent lead-in devices which may be of fixed metallization or CTC solder lugs for discretionary wiring. Each of the sockets is longitudinally bussed to the blue ribbon plug via wires 54. There may be positioned within the 24 sockets any number of elements to be tested, for example, Barnes carriers 42, 14 and 16 lead dual in lines 44 and 46, TO-5 packages having six to 12 leads, 48, 50, and 52. As will be apparent, the entire assembly rests upon the bottom edges 34 and 36 in the oven. The frame adds stiffness to the entire assembly, supports the printed circuit board so that the test components do not take the wear, and the elevated end handle reinforces the entire assembly. The resting of the plastic on the oven metal brackets avoids galling with its contaminating effects. The blue ribbon connector has been selected because of its low inertia and withdrawal force; however, any type of plug may be employed.

There is, also, the possibility of extending the printed circuit forward, so that the edge of the printed circuit can be used in place of the Blue Ribbon Connector 26. In this case, "contact fingers" would be printed on the edge of the board.

Auxiliary components may, also, be wired below the tray to set up specific test circuits which are protected mechanically by the support rail.

Manifestly, both tray and circuit board may be altered without departing from the spirit of the invention.

I claim:

1. A support tray for printed circuit boards adapted for removable insertion in horizontal position in test ovens and the like, having horizontally positioned tray support brackets therein, comprising in combination:

A. a rigid rectangular frame having:

i. at least one open end;

ii. an end handle secured across said open end;

B. a rectangular-shaped printed circuit board of greater width than said frame, superposed on said frame with both side edges of said board extending over and projecting beyond the side edges of said frame, said circuit board being shorter than said frame, such that the closed end of said frame is offset with respect to the end of said circuit board, so as to define a finger hold;

C. longitudinally extending insulated runners attached to the bottom side edges of said board, and i. said runners extending over and projecting beyond said side edges of said frame, with said runners resting on said frame and adapted for horizontal tray-insulating support on the support brackets in an oven;

D. said end handle further including a seat for an electrical connection and an electrical socket, positioned within said seat and wired to said circuit board; and E. said frame being bent into U-shape and said handle extending vertically above and below the open end of said frame, so as to define a hand clasp, and being bent over at top and bottom as a guard for the electrical connection positioned therein.